United States Patent
Rahn et al.

(10) Patent No.: US 9,485,012 B2
(45) Date of Patent: Nov. 1, 2016

(54) OPTICAL LINK PROTECTION USING COMMON MODULATION OF MULTIPLE COMBINED WAVELENGTHS

(71) Applicant: Infinera Corporation, Sunnyvale, CA (US)

(72) Inventors: Jeffrey T. Rahn, Sunnyvale, CA (US); Matthew L. Mitchell, Monte Sereno, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/515,090

(22) Filed: Oct. 15, 2014

(65) Prior Publication Data

US 2016/0112118 A1   Apr. 21, 2016

(51) Int. Cl.
*H04B 10/50* (2013.01)
*H04B 10/032* (2013.01)

(52) U.S. Cl.
CPC .......... *H04B 10/032* (2013.01); *H04B 10/506* (2013.01)

(58) Field of Classification Search
CPC .................................................. H04B 10/506
See application file for complete search history.

(56) References Cited

U.S. PATENT DOCUMENTS

| | | | | |
|---|---|---|---|---|
| 5,710,651 A * | 1/1998 | Logan, Jr. | ........ | H04B 10/25758 398/106 |
| 5,940,196 A * | 8/1999 | Piehler | .................. | H04B 10/50 398/66 |
| 6,246,500 B1 * | 6/2001 | Ackerman | ........... | H04B 10/505 398/115 |
| 6,559,986 B1 * | 5/2003 | Sauer | .................. | H04J 14/0298 398/79 |
| 7,079,780 B1 * | 7/2006 | Rollins | ................ | H04B 10/505 359/238 |
| 7,245,833 B1 * | 7/2007 | Volkening | .......... | H04B 10/2575 398/116 |
| 8,620,158 B2 * | 12/2013 | Peach | .............. | H04B 10/25758 398/183 |
| 8,923,702 B2 * | 12/2014 | Wan | ......................... | H04B 1/28 398/115 |
| 2013/0064546 A1 * | 3/2013 | Peach | ................... | H04B 10/676 398/79 |
| 2013/0256514 A1 * | 10/2013 | Devgan | ................ | G02F 1/0102 250/214 A |

* cited by examiner

*Primary Examiner* — Nathan Curs
(74) *Attorney, Agent, or Firm* — David L. Soltz (57) ABSTRACT

An optical transmitter may include one or more lasers configured to provide a primary optical signal having a primary wavelength and a secondary optical signal having a secondary wavelength to a modulator via corresponding first and second modulator inputs. The modulator may combine the primary and secondary optical signals into a combined optical signal and modulate, with an electrical signal, the combined optical signal to provide a modulated optical signal to an optical filter. The optical filter may be configured to separate, from the modulated optical signal, a modulated primary optical signal having the primary wavelength and a modulated secondary optical signal having the secondary wavelength and provide the modulated primary optical signal to a primary optical link and the modulated secondary optical signal to a secondary optical link.

19 Claims, 9 Drawing Sheets

OPTICAL LINK PROTECTION USING COMMON MODULATION OF MULTIPLE COMBINED WAVELENGTHS

BACKGROUND

Optical networks are capable of high bandwidth, high speed data transmission over long distances. However, the optical links that form an optical network may fail, e.g., when an optical fiber is damaged. A network operator may thus implement an end-to-end link protection scheme to prevent network downtime during an inevitable failure by switching from a primary optical link to a secondary optical link.

SUMMARY

According to some possible implementations, an optical transmitter may include one or more lasers configured to provide a primary optical signal having a primary wavelength and a secondary optical signal having a secondary wavelength. The optical transmitter may further comprise a modulator configured to receive, from the one or more lasers, the primary optical signal via a first modulator input and the secondary optical signal via a second modulator input, combine the primary optical signal and the secondary optical signal into a combined optical signal, modulate, with an electrical signal, the combined optical signal to form a modulated optical signal, and provide the modulated optical signal. The optical transmitter may further include an optical filter configured to receive, from the modulator, the modulated optical signal, separate, from the modulated optical signal, a modulated primary optical signal having the primary wavelength and a modulated secondary optical signal having the secondary wavelength, provide, to a primary optical link, the modulated primary optical signal, and provide, to a secondary optical link, the modulated secondary optical signal.

According to some possible implementations, a system may include an optical transmitter configured to generate a multi-carrier wave comprising a first carrier wave and a second carrier wave, generate an input data signal, modulate the multi-carrier wave with the input data signal to provide a modulated multi-carrier signal, and provide first and second optical signals, from the modulated multi-carrier signal, to corresponding first and second optical links. The first optical signal may have a first wavelength corresponding to the first carrier wave, and the second optical signal may have a second wavelength corresponding to the second carrier wave. The system may further include an optical receiver configured to receive the first and second optical signals via the first and second optical links, and generate, based on a particular optical signal of the first and second optical signals, an output data signal corresponding to the input data signal.

According to some possible implementations, a method may include providing, by a device, an optical signal, the optical signal being associated with a group of wavelengths, and a data signal. The method may further include modulating, by the device, the optical signal with the data signal to provide a modulated optical signal. The method may further include separating, by the device, a first optical signal and a second optical signal from the modulated optical signal, the first optical signal being associated with a first wavelength of the group of wavelengths, and the second optical signal being associated with a second wavelength of the group of wavelengths. The method may further include providing, by the device, the first optical signal to a first optical link, the first optical link being associated with the first wavelength, and the second optical signal to a second optical link, the second optical link being associated with the second wavelength.

DETAILED DESCRIPTION

The following detailed description of example implementations refers to the accompanying drawings. The same reference numbers in different drawings may identify the same or similar elements.

Link protection requires at least two diverse links between a transmitter and a receiver. For example, a transmitter may provide a signal to a passive splitter to transmit an identical signal over multiple links. However, the signal provided by the passive splitter to each link will be weaker than the signal provided by the transmitter to the splitter. Additionally, a particular link may carry various signals having various wavelengths (e.g., each signal occupying a channel in a multiplexed signal), thus using a passive filter would limit a network operator to links accommodating a signal having a particular wavelength (e.g., to links which have a common available channel). A network operator may overcome these limitations by providing a separate transmitter for each link to transmit signals without power loss and in wavelengths accommodated by the diverse links. However, this approach introduces redundancy that may increase the size and/or cost of the transmitting equipment.

Figure 1:
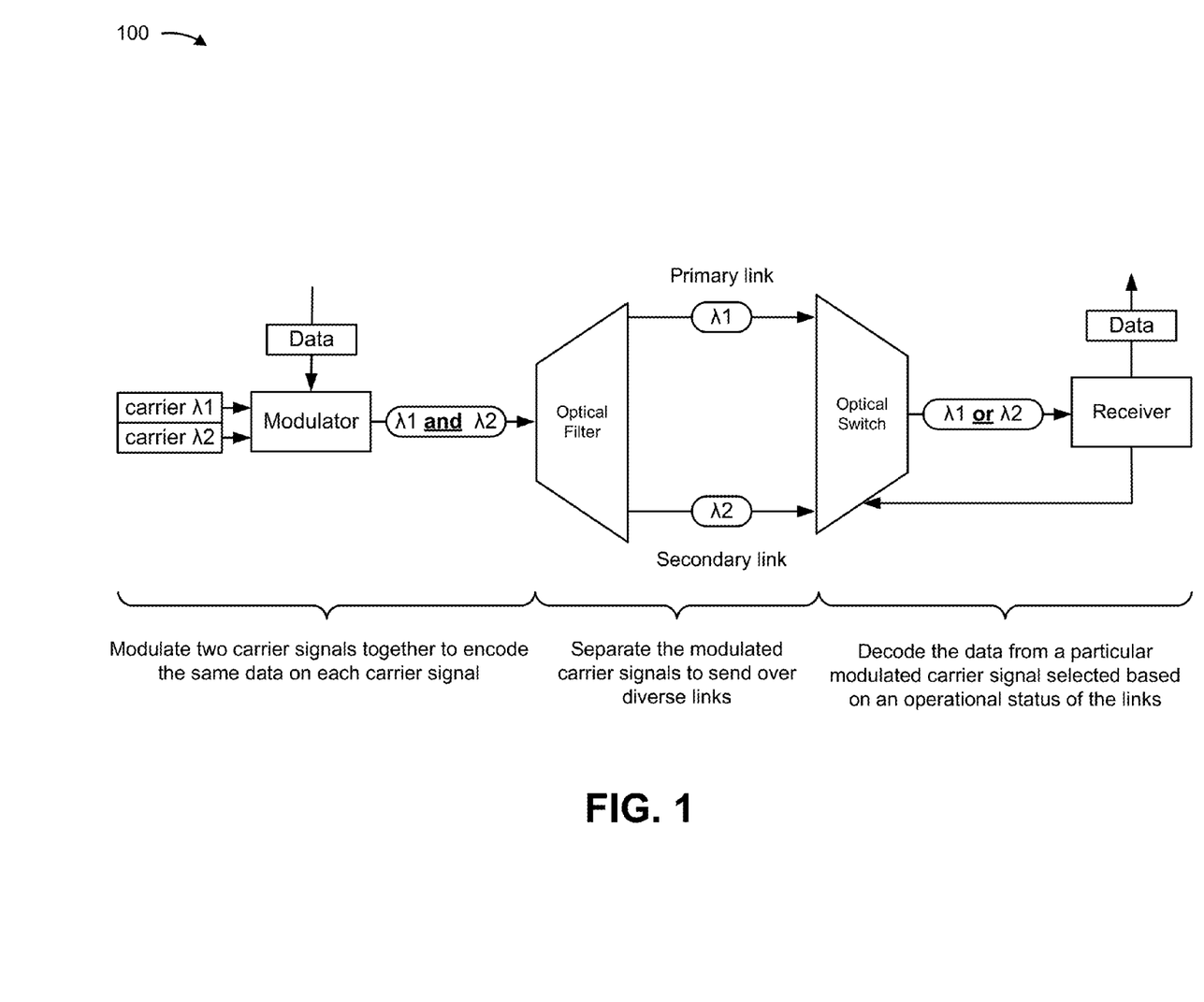
FIG. 1 is a diagram of an overview of an example implementation described herein.

FIG. 1 is a diagram of an overview of an example implementation 100 described herein. Assume, for example implementation 100, that an optical network includes a primary link and a secondary link. Assume further that the primary link may accept an optical signal having a first wavelength ($\lambda 1$) and the secondary link may accept an optical signal having a second wavelength ($\lambda 2$).

Assume that, at a transmitting end of the optical network, a modulator modulates combined first and second carrier waves ($\lambda 1$ and $\lambda 2$) to encode the same data. Assume further that the modulator provides the modulated combined carrier waves to an optical filter which separates the modulated first carrier wave (having wavelength $\lambda 1$) from the modulated second carrier wave (having wavelength $\lambda 2$) and provides the modulated first and/or second carrier waves to the primary and/or secondary links, respectively. Assume further that, at the receiving end of the optical network, an optical switch provides an optical receiver with either the modulated first carrier wave, if the primary link is operational, or the modulated second carrier wave, if the primary link has failed. In this way, a network operator may implement an optical link protection scheme whereby different optical links are provided with the same signal using different wavelengths, without power loss or use of duplicative optical transmitters, by modulating carrier signals having different wavelengths together in a common modulator.

Figure 2:
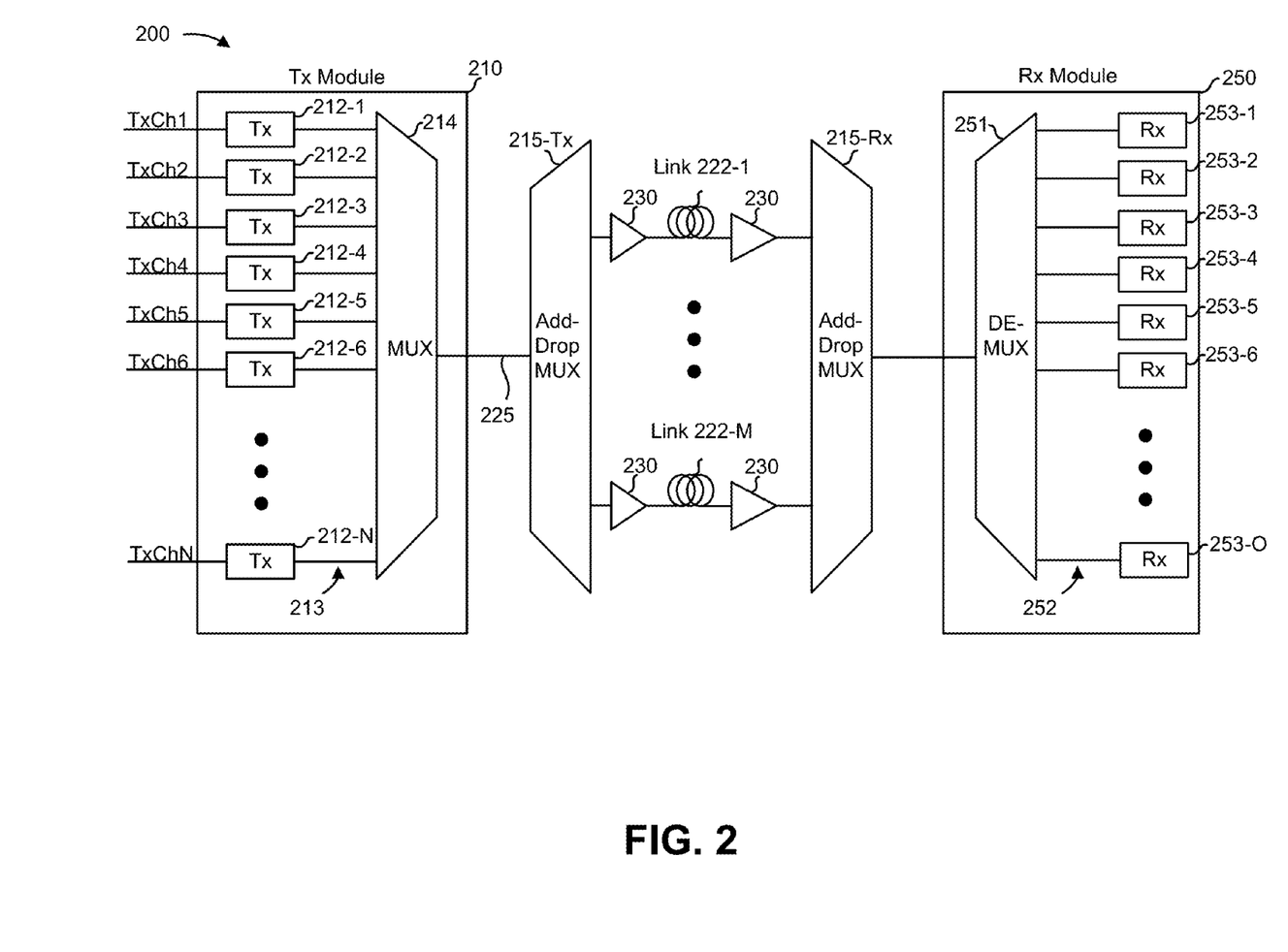
FIG. 2 is a diagram of an example network in which systems and/or methods, described herein, may be implemented.

FIG. 2 is a diagram of an example network 200 in which systems and/or methods, described herein, may be implemented. As shown in FIG. 2, a network may include transmitter module 210 (e.g., a Tx PIC) and/or receiver module 250 (e.g., an Rx PIC). In some implementations, transmitter module 210 may be optically connected to receiver module 250 via optical add-drop multiplexers (OADM) 215-Tx and 215-Rx, links 222-1, . . . , 222-M (M≥2), and/or optical amplifiers 230. Links 222 may include one or more optical amplifiers 230 that amplify an optical signal as the optical signal is transmitted over links 222.

Transmitter module 210 may include a number of optical transmitters 212-1 through 212-N (N≥1), waveguides 213, and/or optical multiplexer 214. Each optical transmitter 212 may receive a data channel (TxCh1 through TxChN), may modulate the data channel with an optical signal, and may transmit the data channel as an optical signal. In some implementations, transmitter module 210 may include 5, 10, 20, 50, 100, or some other quantity of optical transmitters 212. Each optical transmitter 212 may be tuned to use an optical carrier of a designated wavelength or may to use multiple optical carriers of designated wavelengths. It may be desirable that the grid of wavelengths emitted by optical transmitters 212 conform to a known standard, such as a standard published by the Telecommunication Standardization Sector (ITU-T).

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include a power combiner, a tunable filter array, an arrayed waveguide grating (AWG), or some other multiplexing device. In some implementations, optical multiplexer 214 may combine multiple signal channels, associated with optical transmitters 212, into a wave division multiplexed (WDM) signal, such as optical signal 225.

OADM 215-Tx and/or OADM 215-Rx may include one or more thin film filters, fiber Bragg gratings with optical circulators, free space gratings, AWGs, and/or other combinations of devices which include a multiplexer, a demultiplexer, and/or reconfigurable optical paths. In some implementations, OADM 215-Tx may be provided at a transmitting end of links 222 to select and/or separate one or more portions of optical signal 225, corresponding to particular wavelengths or wavelength ranges, and send the one or more portions via a corresponding one or more links 222. Likewise, OADM 215-Rx may be provided at a receiving end of links 222 to select and/or recombine the portion(s) of optical signal 225 received via links 222.

As further shown in FIG. 2, receiver module 250 may include optical demultiplexer 251, waveguides 252, and/or optical receivers 253-1 through 253-O (O≥1). In some implementations, optical demultiplexer 251 may include a power splitter, a tunable filter array, an AWG, or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals output by optical demultiplexer 251 and a local oscillator, convert the signals to a photocurrent, and provide a voltage output to function as an electrical signal representation of the original input signal.

The number and arrangement of devices shown in FIG. 2 are provided for explanatory purposes. In practice, there may be additional devices, fewer devices, different devices, or differently arranged devices than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
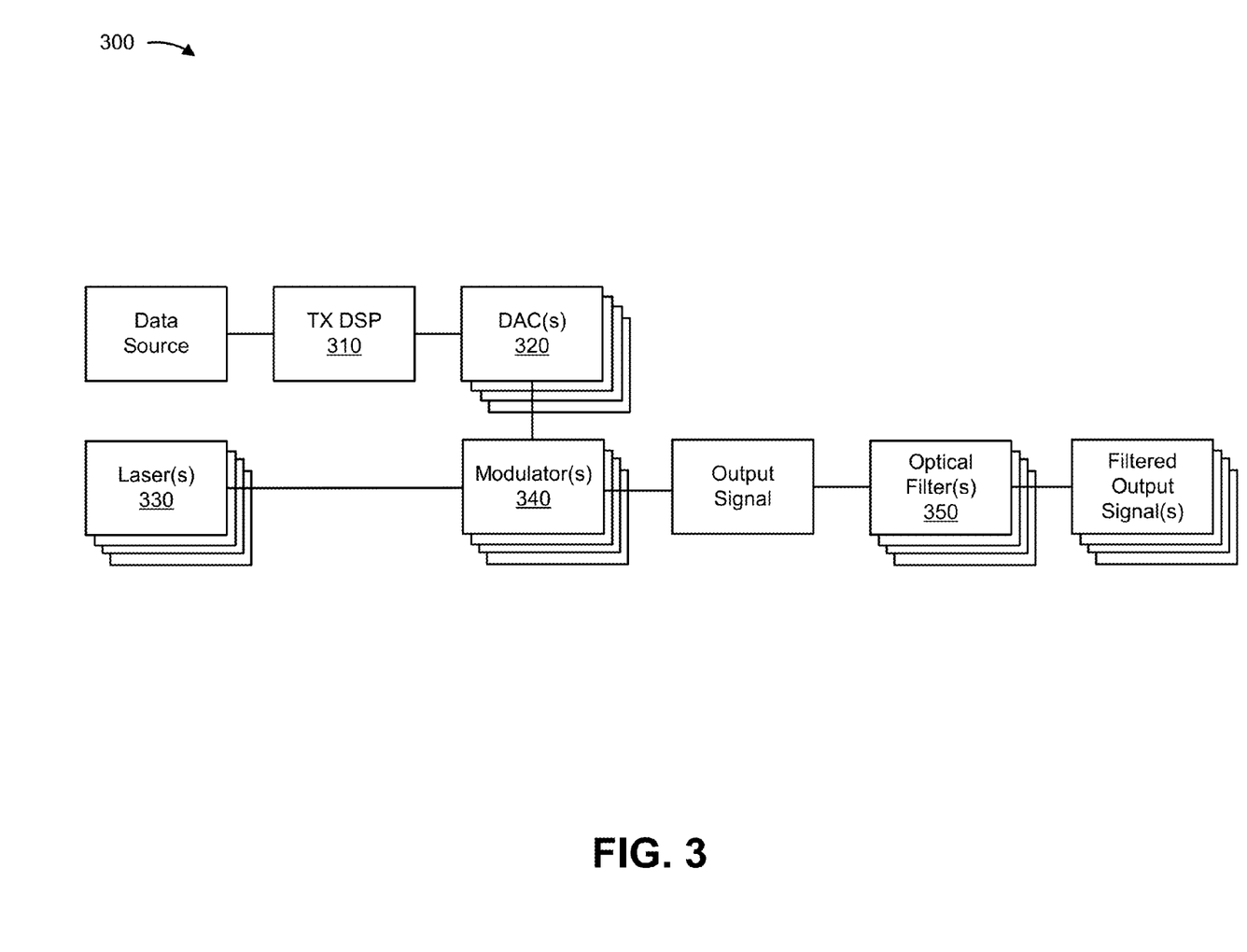
FIG. 3 is a diagram of example components of an optical transmitter shown in FIG. 2.

FIG. 3 is a diagram of example components of optical transmitter 212 shown in network 200 of FIG. 2. As shown in FIG. 3, optical transmitter 212 may include a Tx DSP 310, one or more digital to analog converters (DACs) 320, one or more lasers 330, one or more modulators 340, and one or more optical filters 350. In some implementations, Tx DSP 310, DACs 320, lasers 330, modulators 340, and/or optical filters 350 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 310 may include a digital signal processor or a collection of digital signal processors. In some implementations, Tx DSP 310 may receive a data source (e.g., a signal received via a Tx channel), may process the signal, and may output digital signals having symbols that represent components of the signal (e.g., an in-phase x-polarization component, a quadrature x-polarization component, an in-phase y-polarization component, and a quadrature y-polarization component).

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an x-polarization, a y-polarization) of a signal and/or a particular component of a signal (e.g., an in-phase component, a quadrature component).

Laser 330 may include one or more semiconductor lasers, such as a distributed feedback (DFB) laser or some other type of laser. Laser 330 may provide an output optical light beam to modulator 340.

Modulator 340 may include a Mach-Zehnder modulator (MZM), such as a nested MZM or another type of modulator. Modulator 340 may receive the optical light beam from laser 330 and the voltage signals from DAC 320, and may modulate the optical light beam, based on the voltage signals, to generate an output signal. Modulator 340 may provide the output signal to one or more optical filters 350.

Optical filter 350 may include a fixed filter, such as a thin-film filter or an AWG, and/or an adjustable filter, such as a wavelength selective switch (WSS). For example, optical filter 350 may include a demultiplexer and/or an OADM. Optical filter 350 may receive the output signal from modulator 340, may filter the output signal, and may provide, e.g., to waveguide(s) 213 and/or to multiplexer 214, one or more filtered output signals, corresponding to one or more particular wavelengths of the output signal, to selectively route one or more portions of optical signal 225, based on wavelength, over optical links 222 (e.g., in conjunction with, or as an alternative to, OADM 215-Tx).

In some implementations, optical transmitter 212 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 214 and/or optical filter 350) and polarization multiplexing.

The number and arrangement of components shown in FIG. 3 are provided as an example. In practice, optical transmitter 212 may include additional components, fewer components, different components, or differently arranged components than those shown in FIG. 3. For example, the quantity of DACs 320, lasers 330, modulators 340, and/or optical filters 350 may be selected to implement an optical transmitter 212 that is capable of generating polarization diverse signals for transmission on an optical fiber, such as link 222. Additionally, or alternatively, a set of components shown in FIG. 3 may perform one or more functions described herein as being performed by another set of components shown in FIG. 3.

Figure 4:
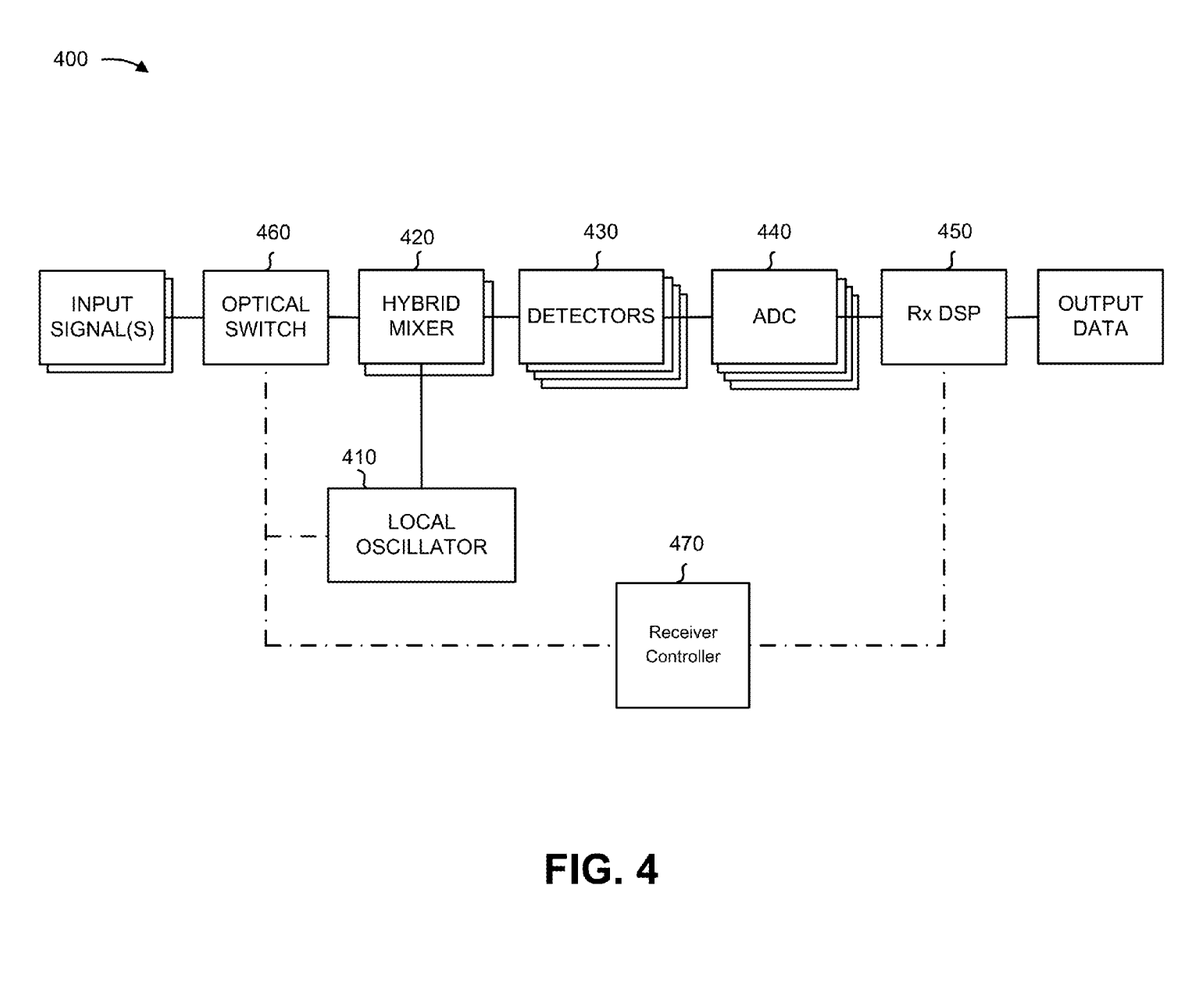
FIG. 4 is a diagram of example components of an optical receiver shown in FIG. 2.

FIG. 4 is a diagram of example components of optical receiver 253 as shown in network 200 of FIG. 2. As shown in FIG. 4, optical receiver 253 may include a local oscillator 410, one or more hybrid mixers 420, one or more detectors 430, one or more analog-to-digital converters (ADCs) 440, an Rx DSP 450, an optical switch 460, and/or a receiver controller 470. In some implementations, local oscillator 410, hybrid mixer 420, detectors 430, ADCs 440, Rx DSP 450, optical switch 460, and/or receiver controller 470 may be implemented on one or more integrated circuits, such as one or more PICs, one or more ASICs, or the like.

Local oscillator 410 may include one or more laser devices. In some implementations, local oscillator 410 may provide a local oscillator signal to hybrid mixer 420. In some implementations, local oscillator 410 may include one or more single-sided lasers to provide an optical signal to one or more hybrid mixers 420. Alternatively, or additionally, local oscillator 410 may include one or more double-sided lasers to provide multiple optical signals to multiple hybrid mixers 420. In some implementations, local oscillator 410 may be configurable to provide a particular local oscillator signal (e.g., by tuning local oscillator 410 to match a particular frequency of the input signal). In some implementations, local oscillator 410 may send and/or receive information to/from receiver controller 470, optical switch 460, and/or Rx DSP 450 (e.g., information associated with a configuring local oscillator 410 to provide a signal having a particular frequency).

Hybrid mixer 420 may include one or more optical devices to receive an input signal (e.g., a WDM signal supplied by optical demultiplexer 251 and corresponding to an output signal, or one or more filtered output signals, provided by transmitter module 210). In some implementations, hybrid mixer 420 may receive a local oscillator signal from local oscillator 410. In some implementations, hybrid mixer 420 may supply components associated with the input signal and a particular local oscillator signal to detectors 430 (e.g., components associated with a phase, intensity, and/or amplitude of the local oscillator signal and/or the input signal) to recover data carried by the input signal. For example, hybrid mixer 420 may supply an in-phase x-polarization (e.g., x-pol) component, a quadrature x-pol component, an in-phase y-polarization (e.g., y-pol) component, and a quadrature y-pol component. In some implementations, a first hybrid mixer 420 may provide the in-phase x-pol component and the quadrature x-pol component, and a second hybrid mixer 420 may provide the in-phase y-pol component and the quadrature y-pol component.

Detector 430 may include one or more photodetectors, such as a photodiode, to receive the output optical signal, from hybrid mixer 420, and convert the output optical signal to corresponding voltage signals. In some implementation, optical receiver 253 may include multiple detectors 430 for in-phase x-pol components, quadrature x-pol components, in-phase y-pol components, and quadrature y-pol components. In some implementations, detectors 430 may include one or more balanced pairs of photodetectors. For example, detectors 430 may include a first pair of photodetectors to receive an in-phase x-pol component, and a second pair of photodetectors to receive a quadrature x-pol component. Additionally, detectors 430 may include a third pair of photodetectors to receive an in-phase y-pol component, and a fourth pair of photodetectors to receive a quadrature y-pol component.

ADC 440 may include an analog-to-digital converter that converts the voltage signals from detector 430 to digital signals. ADC 440 may provide the digital signals to Rx DSP 450. In some implementations, optical receiver 253 may include four ADCs 440 or some other number of ADCs 440 (e.g., one ADC 440 for each electrical signal output by detectors 430).

Rx DSP 450 may include a digital signal processing device or a collection of digital signal processing devices. In some implementations, Rx DSP 450 may receive digital signals from ADCs 440 and may process the digital signals to form output data associated with the input signal received by hybrid mixer 420.

Optical switch 460 may include an optical device that selectively provides a portion of one or more optical input signals based a wavelength of the portion. For example, optical switch 460 may select, from one or more WDM signals provided by optical demultiplexer 251 (e.g., corresponding to an output signal provided by transmitter module 210), a particular input signal (e.g., corresponding to a filtered output signal provided by transmitter module 210 and/or a signal associated with a particular link 222). In some implementations, optical switch 460 may include a mechanical switch (e.g., a micro-electro-mechanical switch), a thermo-optic switch, a free-carrier induced absorption switch, a magneto-optic switch, a liquid-crystal on silicon wavelength-selective switch, and/or an electro-optic switch. Alternatively, or additionally, optical switch 460 may include one or more optical filters for selecting the portion of the optical input signal(s) (e.g., by filtering a wavelength associated with the portion). In some implementations, optical switch 460 may send and/or receive information to/from Rx DSP 450, receiver controller 470, and/or local oscillator 410 (e.g., information associated with selecting the particular optical signal provided by optical switch 460).

Receiver controller 470 may include one or more devices that provide, to one or more other devices, signals that control conditions associated with an optical signal received by receiver 253. In some implementations, receiver controller 470 may be separate from and external to receiver 253. In some implementations, receiver controller 470 may be implemented as a processor, a microprocessor, an ASIC, an FPGA, or the like. In some implementations, receiver controller 470 may implement a link operational status logic for detecting errors associated with an optical input signal (e.g., based on information received from Rx DSP 450 and/or optical switch 460). Additionally, or alternatively, receiver controller 470 may configure local oscillator 410, optical switch 460, OADM 215-Rx, and/or OADM 215-Tx to provide, to detectors 430, an optical signal having a particular wavelength and/or associated with a particular link 222.

While FIG. 4 shows optical receiver 253 as including a particular quantity and arrangement of components, in some implementations, optical receiver 253 may include additional components, fewer components, different components, or differently arranged components. For example, the quantity of local oscillators 410, hybrid mixers 420, detectors 430, ADCs 440, Rx DSPs 450, optical switches 460, and/or receiver controllers 470 may be selected to implement an optical receiver 253 that is capable of receiving polarization diverse signals from an optical fiber, such as link 222. Additionally, or alternatively, a set of components shown in FIG. 4 may perform one or more functions described herein as being performed by another set of components shown in FIG. 4.

Figure 5:
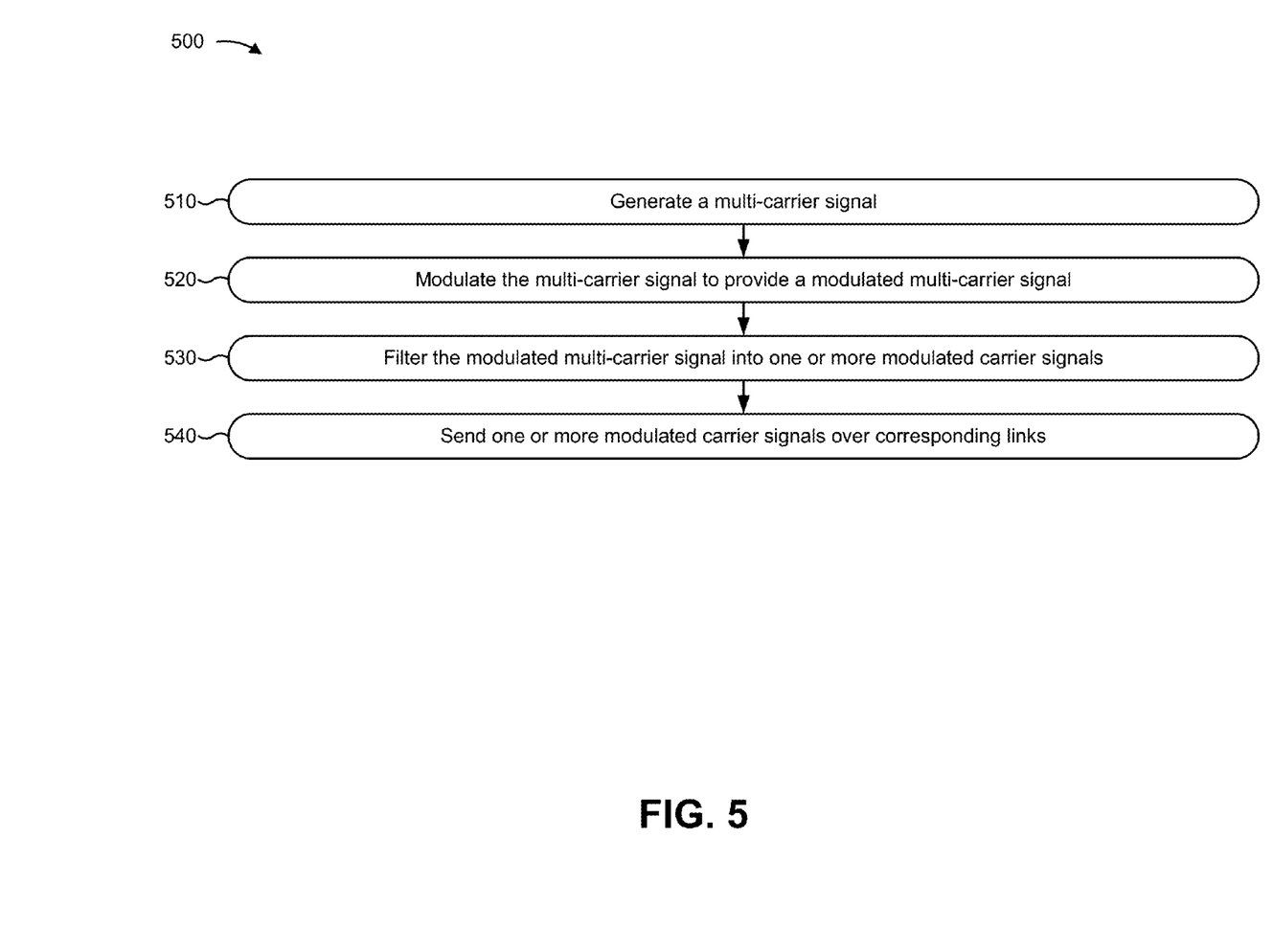
FIG. 5 is a flow chart of an example process for implementing optical link protection at a transmitting end of an optical network.

FIG. 5 is a flow chart of an example process 500 for implementing optical link protection at a transmitting end of an optical network. In some implementations, one or more process blocks of FIG. 5 may be performed by transmitter module 210 (e.g., transmitter 212). In some implementations, one or more process blocks of FIG. 5 may be performed by another component or a group of components separate from or including transmitter module 210, such as OADM 215-Tx, links 222, OADM 215-Rx, receiver module 250 (e.g., by receiver controller 470), or the like.

As shown in FIG. 5, process 500 may include generating a multi-carrier signal (block 510). For example, transmitter 212 of transmitter module 210 may provide a multi-carrier signal comprising carrier signals having particular wavelengths using multiple lasers 330 and/or a laser 330 which provides carrier signals having multiple wavelengths. The particular wavelengths may correspond to wavelengths to be sent via primary and secondary links 222. Tx DSP 310 may select the particular wavelengths dynamically, e.g., by identifying available wavelengths and/or links 222 based on input from a user, a sensor, or the like. Alternatively, or additionally, one or more wavelengths may be fixed (e.g., by using a single-wavelength laser 330). Transmitter 212 may combine the output of multiple lasers 330 by providing the output of each laser 330 to one or more optical combiners and/or to complementary inputs of modulator 340 (e.g., a MZM). In this way, an optical carrier signal provided to modulator 340 may include a primary carrier signal for transmitting a primary output signal via a primary link 222 as well as one or more secondary carrier signals for transmitting secondary output signals via secondary links 222.

As further shown in FIG. 5, process 500 may include modulating the multi-carrier signal to provide a modulated multi-carrier signal (block 520). For example, transmitter 212 may modulate an amplitude, a phase, and/or a polarization of the multi-carrier signal (e.g., via modulator 340) with one or more electrical signals (e.g., from Tx DAC 320) to provide the modulated multi-carrier signal. A constellation complexity and/or symbol rate associated with the modulated multi-carrier signal may be selected based on a desired speed and/or throughput. In this way, modulator 340 may provide an output signal comprising primary and secondary output signals which include the same data.

As further shown in FIG. 5, process 500 may include filtering the modulated multi-carrier signal into one or more modulated carrier signals (block 530). For example, transmitter 212 may separate the primary and/or secondary signals from the modulated multi-carrier signal by passing the modulated multi-carrier signal through one or more optical filters 350 which may filter the modulated multi-carrier signal to provide the primary and/or secondary output signals, alternatively or simultaneously, to multiplexer 214 of Tx module 210. Alternatively, or additionally, OADM 214-Tx may separate the primary and/or secondary signals from the modulated multi-carrier signal to provide the primary and/or secondary output signals, alternatively or simultaneously, to respective optical links 222. In this way, transmitter 212 may provide primary and/or secondary output signals containing the same data.

As further shown in FIG. 5, process 500 may include sending one or more modulated carrier signals over corresponding links (block 540). For example, optical filter(s) 350 of transmitter 212 and/or OADM 214-Tx may provide the primary output signal and/or the secondary output signal(s), alternatively or simultaneously, to corresponding primary optical link 222-1 and/or secondary optical link(s) 222 (e.g., based on operational status information received from receiver module 250). In this way, Tx module 210 may implement optical link protection by providing primary and/or secondary output signals, modulated with the same data and having different wavelengths, to primary and/or secondary optical links 222.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
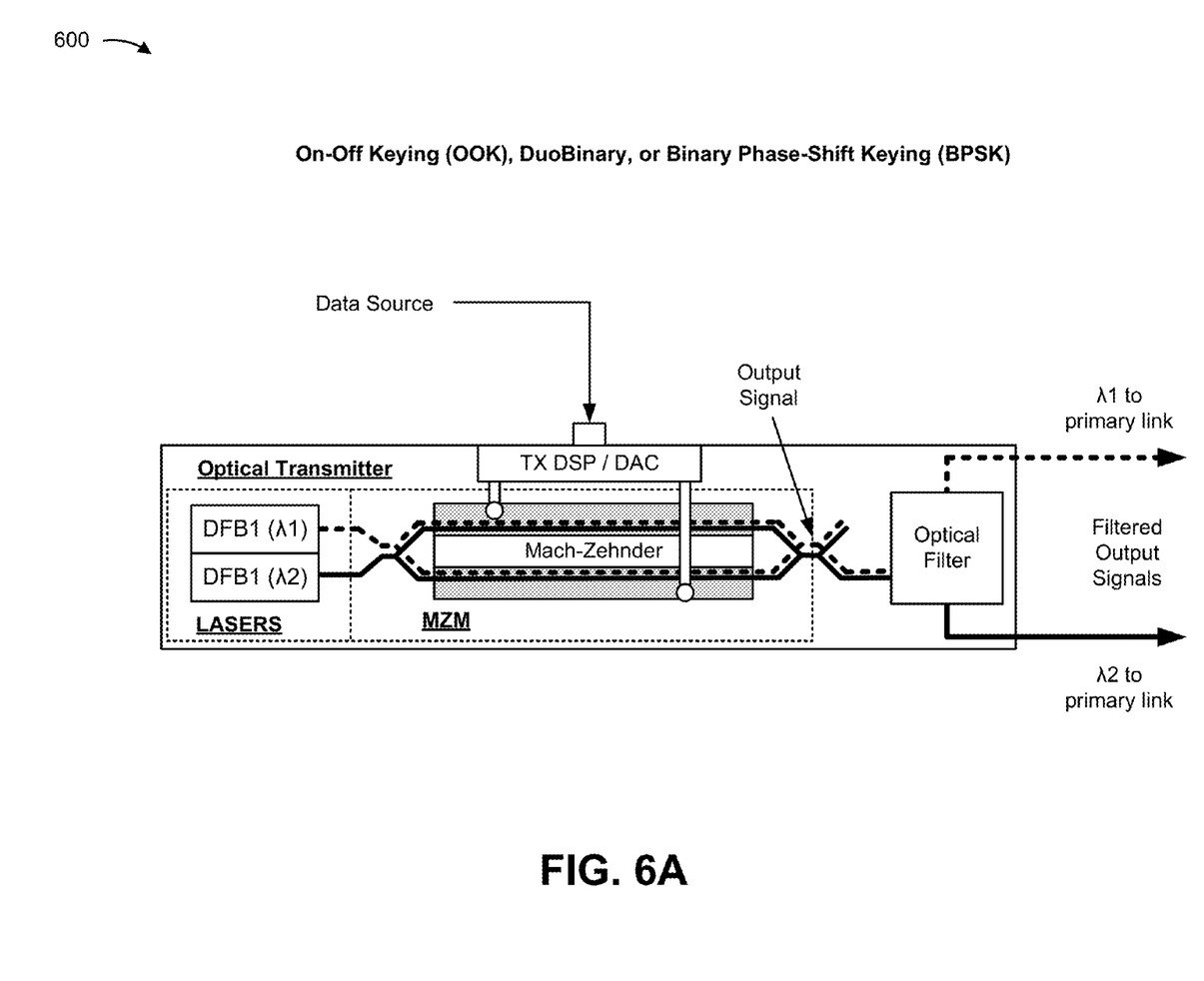
FIGS. 6A and 6B are diagrams of example implementations relating to the example shown in FIG. 5.
Figure 6B:
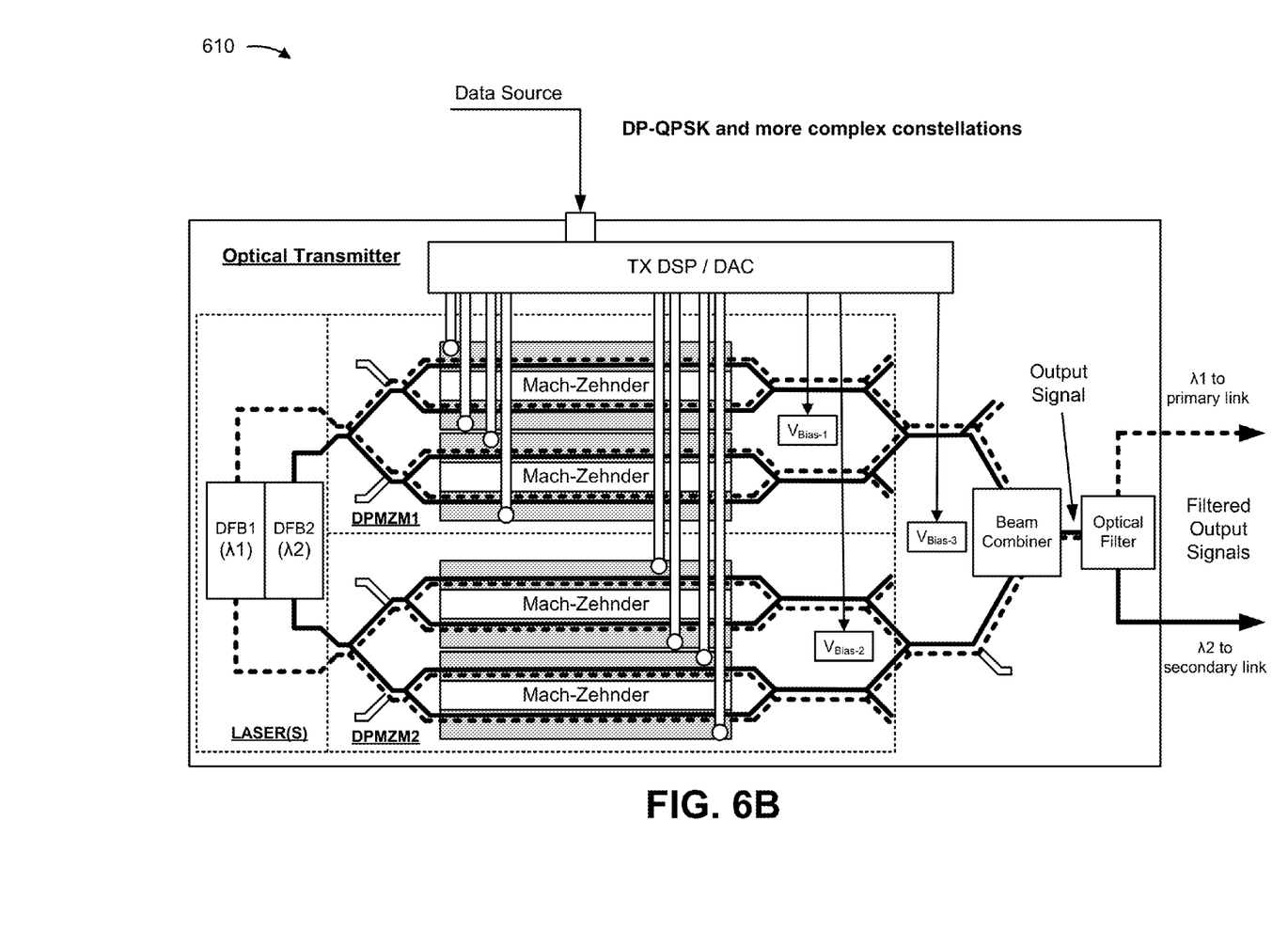

FIGS. 6A and 6B are diagrams of example implementations 600 and 610 relating to example process 500 shown in FIG. 5. FIGS. 6A and 6B show examples of implementing optical link protection at a transmitting end of an optical network.

As shown in FIG. 6A, assume, for example implementation 600, that an optical transmitter (e.g., Tx Module 210) includes two lasers (e.g., lasers 330), a MZM (e.g., modulator 340), a Tx DSP and DAC(s) (e.g., Tx DSP 310 and DAC(s) 320), and an optical filter (e.g., optical filter 350). Assume further that two lasers 330 provide, to corresponding complementary inputs of modulator 340, a corresponding two continuous wave (CW) carrier signals, each having a different wavelength (shown as λ1 and λ2). Modulator 340 combines, without power loss, the CW carrier signals and modulates the combined CW carrier signals with a signal provided by DAC(s) 320 (e.g., based on a data source) to provide an output signal containing the data source encoded onto both carrier signals as, e.g., OOK, DuoBinary, or BPSK. Modulator 340 passes the output signal through an optical filter (e.g., optical filter 350 and/or OADM 215-Tx) to separate a primary optical signal (e.g., having wavelength λ1) from a secondary optical signal (e.g., having wavelength λ2). Assume that a primary link (e.g., optical link 222-1) is configured to accommodate an optical signal having the first wavelength, and a secondary link (e.g., optical link 222-2) is configured to accommodate an optical signal having the second wavelength. The optical filter provides the primary optical signal to link 222-1 and the secondary optical signal to link 222-2. In this way, a single optical transmitter may transmit data, encoded as OOK, DuoBinary, or BPSK, to diverse primary and secondary optical links using wavelengths accommodated by the primary and secondary optical links.

As shown in FIG. 6B, assume, for example implementation 610, that an optical transmitter (e.g., Tx Module 210) includes two double-sided DFB lasers (e.g., lasers 330), a nested pair of dual parallel Mach-Zehnder modulators (e.g., modulator 340, shown as DPMZM1 and DPMZM2), a Tx DSP and DAC(s) (e.g., Tx DSP 310 and DAC(s) 320), a beam combiner (e.g., multiplexer 214 and/or a polarization beam combiner), and an optical filter (e.g., optical filter 350 and/or OADM 215-Tx). Assume further that DPMZM1 receives, via corresponding complementary inputs, CW carrier signals, having different wavelengths (shown as λ1 and λ2), from a first end of lasers 330. Assume further that DPMZM2 likewise receives, via corresponding complementary inputs, CW carrier signals (e.g., λ1 and λ2) from a second end of lasers 330. Assume further that modulator 340 combines, without power loss, the CW carrier signals and modulates, with signals provided by DAC(s) 320 (e.g., based on a data source), the combined CW carrier signals to provide an output signal containing the data source encoded onto both carrier signals.

As further shown in FIG. 6B, assume, for example implementation 610, that Tx Module 210 transmits a modulated signal having a more complex constellation than example implementation 600. For example, Tx DSP 310 and/or DAC 320 may implement DP-QPSK encoding, where DPMZM1 and DPMZM2 act as independent in-phase/quadrature (I/Q) modulators, providing respective portions of the data signal encoded as separate QPSK signals; $V_{Bias-1}$ and $V_{Bias-2}$ provide a 90 degree (π/4 radian) phase shift between the legs of DPMZM1 and DPMZM2; and the beam combiner rotates the QPSK signal from DPMZM1 90 degrees (π/4 radian) relative to the QPSK signal from DPMZM2 so that the two QPSK signals are polarized orthogonally. Alternatively, Tx DSP 310 and/or DAC 320 may implement, e.g., 16-QAM or another higher-order modulation format, by providing a multi-level signal to DPMZM1 and DPMZM2.

As further shown in FIG. 6B, assume, for example implementation 610, that the beam combiner provides the output signal to the optical filter, which separates a primary data signal (e.g., having wavelength λ1) from a secondary data signal (e.g., having wavelength λ2). Assume further that the optical filter provides the primary data signal to a primary link (e.g., link 222-1) and the secondary data signal to a secondary link (e.g., line 222-2). In this way, a single optical transmitter may transmit data, encoded as DP-QPSK, as 16-QAM, or using a more complex constellation, to diverse primary and secondary optical links using wavelengths accommodated by the primary and secondary optical links.

As indicated above, FIGS. 6A and 6B are provided merely as examples. Other examples are possible and may differ from what was described with regard to FIGS. 6A and 6B. For example, rather than, or in addition to, providing carrier signals to complementary inputs of a Mach-Zehnder modulator, carrier signals may be combined, e.g., using a power combiner or an optical filter, and the combined signal may be provided to an input of the modulator.

Figure 7:
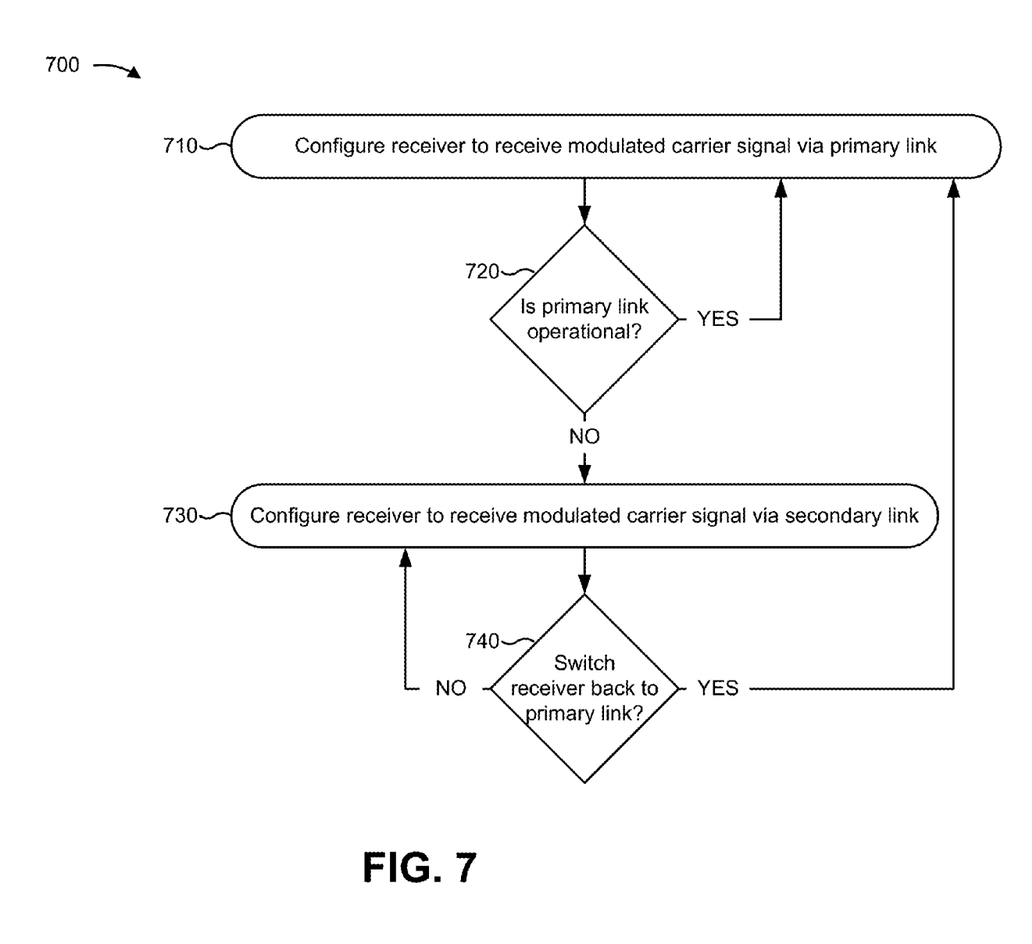
FIG. 7 is a flow chart of an example process for implementing optical link protection at a receiving end of an optical network.

FIG. 7 is a flow chart of an example process 700 for implementing optical link protection at a receiving end of an optical network. In some implementations, one or more process blocks of FIG. 7 may be performed by receiver module 250 (e.g., local oscillator(s) 410, hybrid mixer 420, ADC 440, Rx DSP 450, optical switch 460, receiver controller 470, etc.). In some implementations, one or more process blocks of FIG. 6 may be performed by another component or a group of components separate from or including receiver module 250, such as OADM 215-Rx, links 222, OADM 215-Tx, Tx Module 210, or the like.

As shown in FIG. 7, process 700 may include configuring a receiver to receive a modulated carrier signal via a primary link (block 710). For example, OADM 215-Rx may provide an optical path between a primary link 222-1, a demultiplexer 251, and/or a primary optical receiver 253-1 of a receiver module 250 (e.g., an optical receiver associated with a particular input signal received from and/or associated with primary link 222-1). Alternatively, or additionally, a receiver controller 470 may configure primary optical receiver 253-1 to receive a primary wavelength associated with primary link 222-1. For example, receiver controller 470 may configure local oscillator 410 to provide, to hybrid mixer(s) 420, a local oscillator signal having the primary wavelength. Alternatively, or additionally, receiver controller 470 may likewise configure optical switch 460 to provide, to hybrid mixer(s) 420, an optical input from primary link 222-1. In this way, receiver module 250 may receive a modulated optical signal, to provide the output data encoded therein, from primary optical link 222-1.

As further shown in FIG. 7, process 700 may include determining whether the primary link is operational (block 720). For example, Rx DSP 450 and/or receiver controller 470 of receiver 250 may implement a link operational status logic to determine, continuously, periodically, or occasionally, whether primary link 222-1 is operational. The determination may be based on information associated with the particular input signal received via primary link 222-1 and may include determining whether a signal strength associated with the particular input signal satisfies a signal strength threshold and/or whether a quantity associated with signal error satisfies a signal error threshold (e.g., based on parity information, checksum information, a cyclic redundancy check, a cryptographic hash function, or the like). For example, Rx DSP 450 and/or receiver controller 470 may determine whether primary link 222-1 is operation based on a parity check status after error correction is complete, an ability of a forward error correction algorithm to successfully decode frames, and/or the satisfaction of a threshold associated with a rate of forward error correction. Alternatively, or additionally, the determination of whether primary link 222-1 is operational may be based on receiving input from a user, sensor, or the like that is associated with identifying and/or determining the operational status of primary link 222-1. For example, a user or sensor may indicate that primary link 222-1 is not operational regardless of whether primary link 222-1 has suffered a physical failure (e.g., to test the optical link protection). In this way, receiver module 250 may determine whether to receive, or to continue to receive, the input signal via primary link 222-1 or to switch to a secondary link 222-2.

As further shown in FIG. 7, if the primary link is determined to be operational (block 720=YES), process 700 may include configuring the receiver to continue receiving the modulated carrier signal via the primary link (block 710). For example, Rx DSP 450 and/or receiver controller 470 may determine primary link 222-1's operational status in a control flow loop where receiver module 250 remains configured to receive the modulated carrier signal via primary link 222-1 while primary link 222-1 remains operational.

As further shown in FIG. 7, if the primary link is determined not to be operational (block 720=NO), process 700 may include configuring the receiver to receive the modulated carrier signal via a secondary link (block 730). For example, OADM 215-Rx may provide an optical path between a secondary link 222-2, demultiplexer 251, and/or primary optical receiver 253-1. Alternatively, or additionally, Rx DSP 450 and/or receiver controller 470 may configure primary optical receiver 253-1 to receive a secondary wavelength associated with secondary link 222-2. For example, Rx DSP 450 and/or receiver controller 470 may configure local oscillator 410 to provide, to hybrid mixer(s) 420, a local oscillator signal having the secondary wavelength. Alternatively, or additionally, Rx DSP 450 and/or receiver controller 470 may likewise configure optical switch 460 to provide, to hybrid mixer(s) 420, an optical input from secondary link 222-2. Alternatively, or additionally, optical receiver 253-1 may provide information, indicating that primary link 222-1 is not operational, to transmitter module 210. In this way, receiver module 250 may receive a modulated optical signal, to provide the output data encoded therein, from secondary optical link 222-2 when primary link 222-1 is determined to be not operational.

As further shown in FIG. 7, process 700 may include determining whether to switch the receiver back to the primary link (block 740). For example, Rx DSP 450 and/or receiver controller 470 of optical receiver 253-1 may continuously, periodically, or occasionally determine whether to configure optical receiver 253-1 to receive the modulated carrier signal via primary link 222-1 based on a link operational status associated with primary link 222-1 and/or secondary link 222-2 (e.g., to automatically switch to primary link 222-1 when primary link 222-1 becomes operational and/or when secondary link 222-2 becomes not-operational). Alternatively, or additionally, Rx DSP 450 and/or receiver controller 470 may determine whether to configure optical receiver 253-1 to receive the modulated carrier signal via primary link 222-1 based on receiving information associated with determining that optical receiver 253-1 is to be switched back to primary link 222-1 (e.g., from user and/or sensor input, or the like). In this way, receiver module 250 may determine whether to receive an input signal via primary link 222-1 or via secondary link 222-2.

As further shown in FIG. 7, if the receiver is to be switched back to the primary link (block 740=YES), process 700 may include configuring the receiver to receive the modulated carrier signal via the primary link (e.g., block 710). In this way, receiver module 250 may resume receiving the optical input signal from primary link 222-1, e.g., when primary link 222-1 is once again operational.

As further shown in FIG. 7, if the receiver is not to be switched back to the primary link (block 740=NO), process 700 may include configuring the receiver to continue receiving the modulated carrier signal via the secondary link (e.g., block 730). For example, Rx DSP 450 and/or receiver controller 470 may implement a control flow loop where the receiver module 250 remains configured to receive the modulated carrier signal via secondary link 222-2 until determining to switch back to the primary link 222-1 (e.g., when primary link 222-1 is operational).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
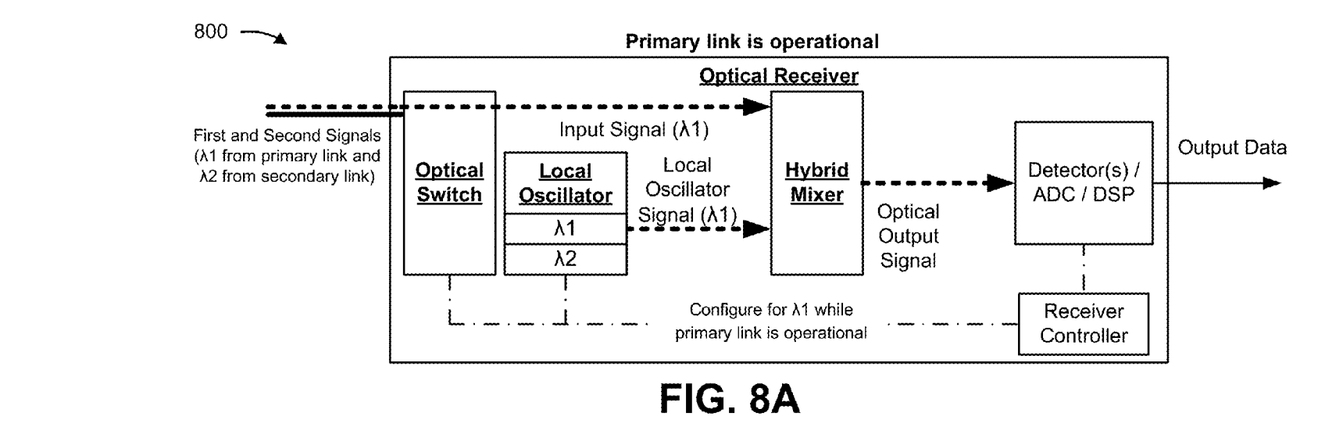
FIGS. 8A and 8B are diagrams of example implementations relating to the example process shown in FIG. 7.
Figure 8B:
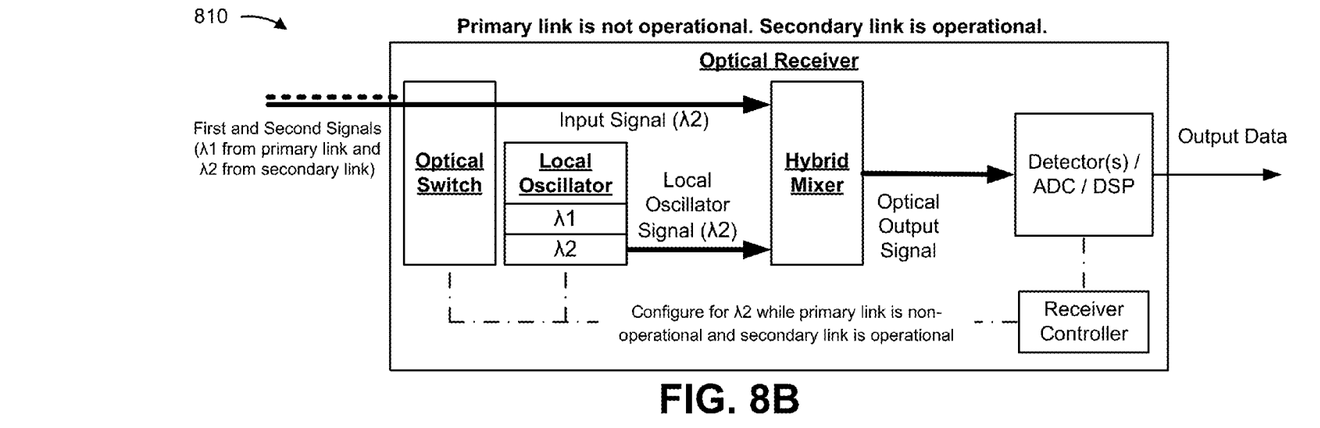

FIGS. 8A and 8B are diagrams of example implementations 800 and 810 relating to the example process shown in FIG. 7. FIGS. 8A and 8B show examples of implementing optical link protection at a receiving end of an optical network.

As shown in FIG. 8A, assume, for example implementation 800, that an optical receiver (e.g., optical receiver 253-1) receives a primary signal, having a first wavelength ($\lambda1$), from a primary link (e.g., link 222-1) and a secondary signal, having a second wavelength ($\lambda2$), from a secondary link (e.g., link 222-2). Assume further that an optical switch (e.g., optical switch 460) of optical receiver 253-1 provides, from the primary and secondary signals, the primary signal as an input signal to a hybrid mixer of optical receiver 253-1 (e.g., hybrid mixer 420). Assume further that a local oscillator of optical receiver 253-1 (e.g., local oscillator 410) provides, to hybrid mixer 420, a local oscillator signal having the first wavelength ($\lambda1$). Hybrid mixer 420 provides a combination of the input signal and the local oscillator signal as an optical output signal to one or more detectors (e.g., detectors 430) of optical receiver 253-1. Assume further that, based on processing the optical output signal through detectors 430, an ADC (e.g., ADC 440), and an Rx DSP (e.g., Rx DSP 450), optical receiver 253-1 provides output data. Assume further that Rx DSP 450 and/or receiver controller 470 determines, based on information contained in the input signal and/or information received from optical switch 460, that primary link 222-1 is operational, and based on this determination, receiver controller 470 controls optical switch 460 to continue providing the primary signal as the input signal and local oscillator 410 to continue providing the local oscillator signal having the first wavelength ($\lambda1$). In this way, optical receiver 253-1 provides output data based on the signal received via primary link 222-1 when primary link 222-1 is operational.

As shown in FIG. 8B, assume, for example implementation 810, that primary link 222-1 becomes non-operational (e.g., link 222-1, or a device associated with link 222-1, is damaged and/or corrupts the primary signal). Assume further that Rx DSP 450 and/or receiver controller 470 determines, based on information contained in the input signal and/or information received from optical switch 460, that primary link 222-1 is non-operational. Based on determining that primary link 222-1 is non-operational receiver controller 470 directs optical switch 460 to provide the secondary signal, from secondary link 222-2, as the input signal to hybrid mixer 420 and further directs local oscillator 410 to provide the local oscillator signal having the second wavelength ($\lambda 2$). In this way, optical receiver 253-1 provides output data based on the secondary signal received via secondary link 222-2 when primary link 222-1 is non-operational. Assume further that Rx DSP 450 and/or receiver controller 470 continues to determine whether primary link 222-1 is operational, and receiver controller 470 configures optical receiver 253-1 to receive the primary signal when primary link 222-1 becomes operational.

As indicated above, FIGS. 8A and 8B are provided merely as examples. Other examples are possible and may differ from what was described with regard to FIGS. 8A and 8B.

Implementations described herein provide optical protection for an optical network. A transmitter module may encode data by modulating multiple combined carrier signals, having multiple wavelengths, together to provide a modulated multi-carrier signal. The modulated multi-carrier signal may be separated to provide modulated carrier signals over diverse optical links. A receiver module may select, from the modulated carrier signals sent over the diverse optical links, a particular modulated carrier signal and decode the data contained therein.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   a transmitter including:
   one or more lasers configured to:
   provide a primary optical signal having a primary wavelength and a secondary optical signal having a secondary wavelength;
   a modulator configured to:
   receive, from the one or more lasers, the primary optical signal via a first modulator input and the secondary optical signal via a second modulator input,
   combine the primary optical signal and the secondary optical signal into a combined optical signal,
   modulate, with an electrical signal, the combined optical signal to form a modulated optical signal, and
   provide the modulated optical signal; and
   an optical filter configured to:
   receive, from the modulator, the modulated optical signal,
   separate, from the modulated optical signal, a modulated primary optical signal having the primary wavelength and a modulated secondary optical signal having the secondary wavelength, and
   provide, to a primary optical link, the modulated primary optical signal, and
   provide, to a secondary optical link, the modulated secondary optical signal; and
   a receiver, including:
   an optical switch that is coupled to the first and second optical links,
   a hybrid mixer, and
   first and second local oscillators,
   wherein the optical switch selectively supplies one of the primary optical signal and the secondary optical signal to the hybrid mixer, such that when the primary optical signal is supplied to the hybrid mixer, light from the first local oscillator is provided to the hybrid mixer, and, when the secondary optical signal is supplied to the hybrid mixer, light from the second local oscillator is provided to the hybrid mixer.

2. The system of claim 1, where
   the optical filter is further configured to:
   simultaneously provide the primary optical signal to the primary optical link and the secondary optical signal to the secondary optical link.

3. The system of claim 1, where
   the optical filter is further configured to:
   selectively provide the primary optical signal to the primary optical link and the secondary optical signal to the secondary optical link.

4. The system of claim 1, where
   the one or more lasers are further configured to:
   control the secondary wavelength of the secondary optical signal based on information associated with an operational status of the primary optical link.

5. The system of claim 1, where
   the one or more lasers are further configured to:
   control the secondary wavelength based on an available wavelength associated with the secondary optical link.

6. The system of claim 1, where
the one or more lasers comprise:
a first laser configured to provide the primary optical signal; and
a second laser configured to provide the secondary optical signal.

7. The system of claim 1, where the modulator is a Mach-Zehnder modulator.

8. A system comprising,
an optical transmitter configured to:
generate a multi-carrier wave comprising a first carrier wave and a second carrier wave,
generate an input data signal,
modulate the multi-carrier wave with the input data signal to provide a modulated multi-carrier signal, and
provide first and second optical signals, from the modulated multi-carrier signal, to corresponding first and second optical links,
the first optical signal having a first wavelength corresponding to the first carrier wave,
the second optical signal having a second wavelength corresponding to the second carrier wave;
an optical receiver configured to:
receive the first and second optical signals via the first and second optical links, and
generate, based on a particular optical signal of the first and second optical signals, an output data signal corresponding to the input data signal,
where the optical transmitter, when providing the first and second optical signals to the corresponding first and second optical links, is further configured to:
separate, from the modulated multi-carrier wave, the first optical signal having the first wavelength,
provide, to the first optical link, the first optical signal,
separate, from the modulated multi-carrier wave, the second optical signal having the second wavelength, and
provide, to the second optical link, the second optical signal.

9. The system of claim 8, where the optical receiver is further configured to:
determine whether the first optical link is operational, and
select the particular optical signal based on determining whether the first optical link is operational.

10. The system of claim 8, where
the optical receiver is further configured to:
send, via at least one of the first optical link or the second optical link, information associated with determining whether the first optical link is operational; and
the optical transmitter is further configured to:
receive, via at least one of the first optical link or the second optical link, the information associated with determining whether the first optical link is operational, and
provide the first optical signal or the second optical signal to the corresponding first optical link or second optical link based on the information associated with determining whether the first optical link is operational.

11. The system of claim 8, where the optical receiver, when generating the output data, is further configured to:
control a local oscillator to provide a local oscillator signal associated with the particular optical signal, and
generate the output data based on a combination of the particular optical signal and the local oscillator signal.

12. The system of claim 8, where the optical transmitter, when providing the first and second optical signals to the corresponding first and second optical links, is further configured to:
provide the modulated multi-carrier wave to an optical add-drop multiplexer,
the optical add-drop multiplexer being optically connected to the first and second optical links and being further configured to provide the first and second optical signals to the corresponding first and second optical links.

13. The system of claim 8, where the optical receiver, when receiving the first and second optical signals via the first and second optical links, is further configured to:
receive the first and second optical signals via an optical add-drop multiplexer, the optical add-drop multiplexer being optically connected to the first and second optical links and being further configured to provide the particular optical signal to the optical receiver.

14. A method, comprising:
providing, by a device, an optical signal,
the optical signal being associated with a group of wavelengths;
providing, by the device, a data signal;
modulating, by the device, the optical signal with the data signal to provide a modulated optical signal;
separating, by the device, a first optical signal and a second optical signal from the modulated optical signal,
the first optical signal being associated with a first wavelength of the group of wavelengths,
the second optical signal being associated with a second wavelength of the group of wavelengths;
providing, by the device, the first optical signal to a first optical link,
the first optical link being associated with the first wavelength; and
providing, by the device, the second optical signal to a second optical link,
the second optical link being associated with the second wavelength,
selectively supplying one of the first optical signal and the second optical signal to a hybrid mixer,
supplying first light from a first local oscillator to the hybrid mixer when the first optical signal is supplied to the hybrid mixer, and
supplying second light from a second local oscillator to the hybrid mixer when the second optical signal is supplied to the hybrid mixer.

15. The method of claim 14, where providing the first optical signal to the first optical link and the second optical signal to the second optical link further comprises:
providing, simultaneously, the first optical signal to the first optical link and the second optical signal to the second optical link.

16. The method of claim 14, where providing the first optical signal to the first optical link and the second optical signal to the second optical link further comprises:
determining an operational status associated with the first optical link;
selectively providing the first optical signal to the first optical link or the second optical signal to the second optical link based on the operational status associated with the first optical link.

17. The method of claim 14, where providing the optical signal further comprises:

providing a first carrier signal from a first laser to a first input of a modulator;
providing a second carrier signal from a second laser to a second input of the modulator; and
combining the first carrier signal and the second carrier signal in the modulator to provide the optical signal.

18. The method of claim 14, where providing the first optical signal to the first optical link further comprises:
providing the modulated optical signal to an optical filter, where the optical filter is configured to allow light having the first wavelength to pass through; and
providing, to the first optical link, the light that passes through the optical filter as the first optical signal.

19. The method of claim 18, where providing the modulated optical signal to the optical filter further comprises:
combining the modulated optical signal with other optical signals to generate a multiplexed optical signal; and
providing the multiplexed optical signal, comprising the modulated optical signal, to the optical filter.

\* \* \* \* \*